(No Model.) 2 Sheets—Sheet 1.

C. W. A. KOELKEBECK.
AUTOMATIC SPEED REGULATOR.

No. 335,460. Patented Feb. 2, 1886.

Witnesses:
Theo. L. Popp.
Chas. J. Buchheit.

C. W. A. Koelkebeck. Inventor.
By Wilhelm Bonner,
Attorneys.

(No Model.) 2 Sheets—Sheet 2.

C. W. A. KOELKEBECK.
AUTOMATIC SPEED REGULATOR.

No. 335,460. Patented Feb. 2, 1886.

Witnesses:
Theo. L. Popp.
Chas. J. Buchheit.

Inventor:
C. W. A. Koelkebeck
By Wilhelm & Bonner
Attorneys.

UNITED STATES PATENT OFFICE.

CHARLES W. A. KOELKEBECK, OF CAMDEN, NEW JERSEY.

AUTOMATIC SPEED-REGULATOR.

SPECIFICATION forming part of Letters Patent No. 335,460, dated February 2, 1886.

Application filed December 2, 1885. Serial No. 184,402. (No model.)

*To all whom it may concern:*

Be it known that I, CHARLES W. A. KOELKEBECK, of Camden, in the county of Camden and State of New Jersey, have invented new and useful Improvements in Automatic Speed-Regulators, of which the following is a specification.

This invention relates to an improvement in a device whereby rotary motion is transmitted from one shaft or pulley to another by a friction or coupling device, which connects the parts so long as the speed of the same is normal or below the normal, and which disconnects the parts automatically by centrifugal action when the speed exceeds the normal, thereby permitting the driven part to reduce its speed by the resistance of the driven machinery until the normal speed is again reached, when the friction or coupling device automatically restores the connection between the driving and driven parts.

The object of my invention is to so construct the automatic friction or coupling devices that the pulley or wheel to which they are applied is perfectly balanced and otherwise safe in use, which is of vital importance in this class of devices, as they revolve at such a high rate of speed that anything which tends to throw the pulley or wheel out of balance not only causes excessive friction, but renders the device exceedingly dangerous.

My invention consists, to these ends, of the improvements which will be hereinafter fully set forth, and pointed out in the claims.

Figure 1:
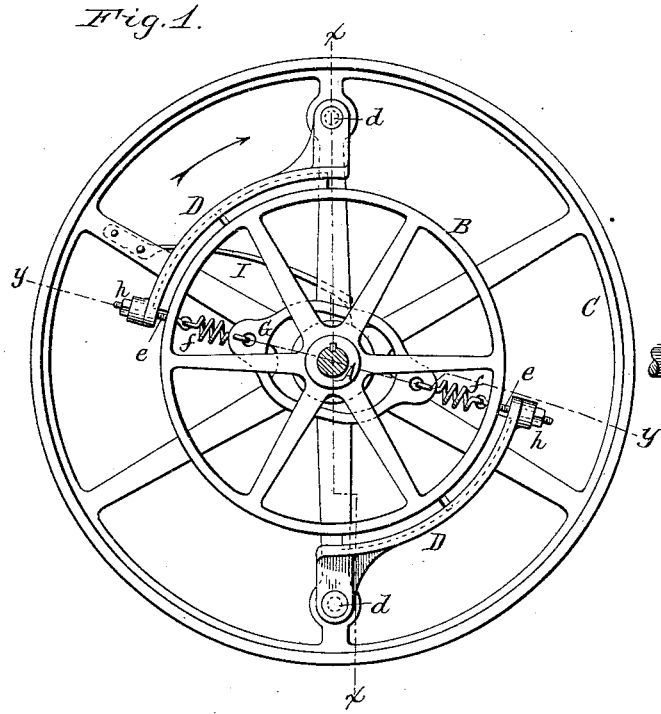
Figure 2:
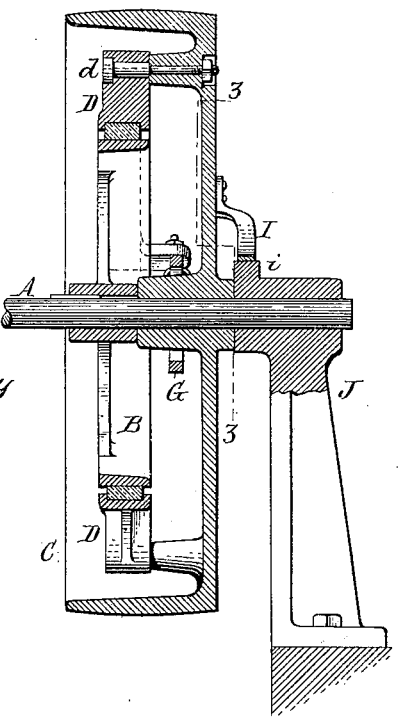
Figure 3:
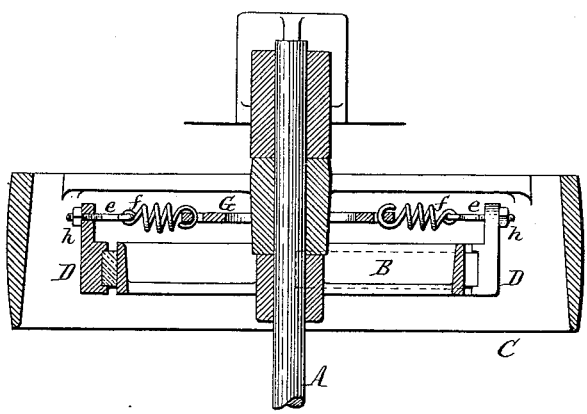
Figure 4:
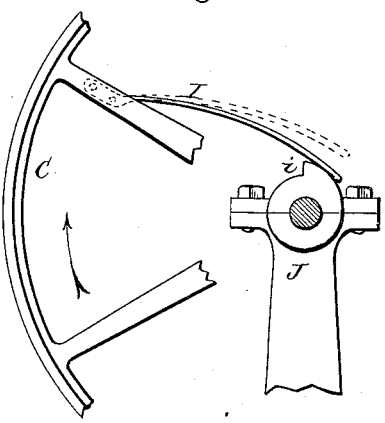
Figure 5:
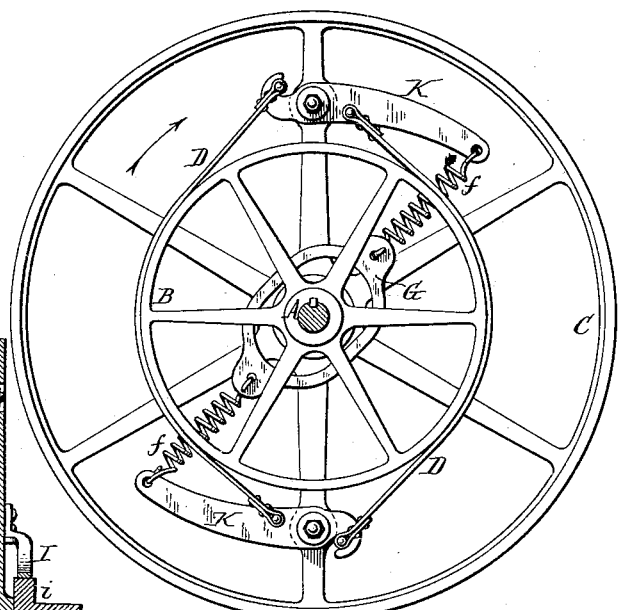
Figure 7:
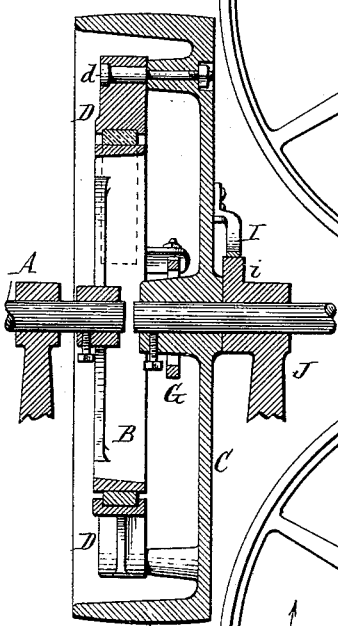
Figure 6:
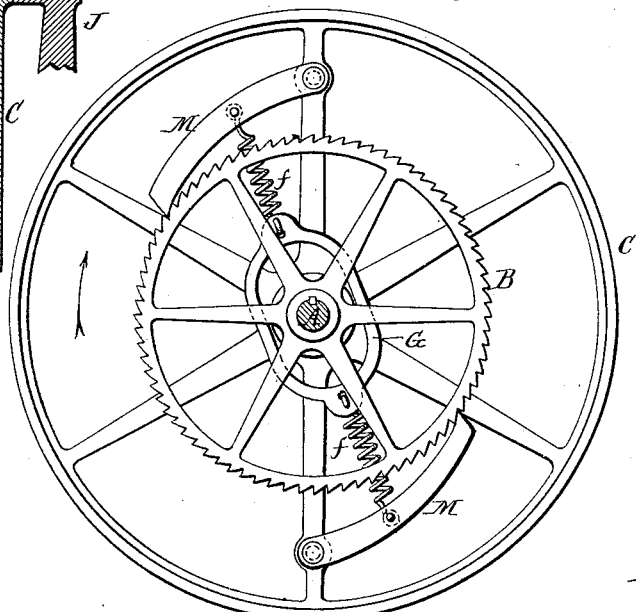

In the accompanying drawings, consisting of two sheets, Figure 1 is a side elevation of my improved safety device or automatic speed-regulator. Fig. 2 is a sectional elevation in line $x\,x$, Fig. 1. Fig. 3 is a sectional elevation in line $y\,y$, Fig. 1. Fig. 4 is a cross-section in line $z\,z$, Fig. 2. Figs. 5 and 6 are side elevations showing modified constructions of the safety device or automatic speed-regulator. Fig. 7 is a fragmentary section showing the device employed as a safety-coupling.

Like letters of reference refer to like parts in the several figures.

A represents the driving-shaft, and B the wheel or pulley secured to the same so as to turn therewith.

C is a wheel or pulley to which motion is transmitted from the wheel or pulley B, and which surrounds the latter. The wheel or pulley C may be mounted loosely on the driving-shaft A, as represented in Figs. 2 and 3; or it may be secured to a separate shaft, which is arranged in line with the driving-shaft A, as represented in Fig. 7. Power may be transmitted to the driven machinery by a belt or other transmitting device applied to the face of the pulley C, or by the shaft to which the pulley is secured, as may be preferred.

D represents the automatic coupling devices by which motion is transmitted from the wheel B to the wheel C until the speed exceeds the normal, when the devices D are automatically released from the wheel B by the centrifugal force, thereby releasing the wheel C from the wheel B until the speed of the wheel C has slackened and become again normal, when the coupling devices D are automatically thrown in engagement with the wheel B.

As represented in Figs. 1, 2, and 3, the coupling devices D are constructed in the form of brake shoes and blocks, which bear against the face of the wheel B, and which are pivoted to the side of the wheel C by bolts $d$, diametrically opposite each other. The brake-shoes D extend from their pivots partly around the face of the wheel B in the same direction, compared with the direction in which the wheel rotates, and have their free ends also arranged diametrically opposite each other. The free ends of the brake-shoes are each provided with a radial screw-bolt, $e$, passing through the brake-shoe, and provided on the inner side thereof with an eye, which connects with a coiled spring, $f$. The inner ends of the two springs $f$ are attached to the ends of a link or loop, G, which surrounds the shaft, and the opening of which is sufficiently large to permit the link to move to and fro in adjusting the springs. The outer ends of the bolts $e$ are provided with nuts $h$, whereby the tension of the springs is adjusted. The springs hold the brakes D against the face of the wheel B, and cause the latter to transmit its motion to the wheel C until the speed of the wheel C exceeds the normal, when the centrifugal force, acting upon the pivoted brakes, overcomes the pressure of the springs $f$ and causes the brakes to swing away from the wheel B, thereby disconnecting the wheel C from the wheel B. The speed of the wheel C now slackens until it has again reached the normal, when the pressure of the springs $f$ preponderates over the action of the centrifugal force on the brakes and applies the latter again to the wheel B, thereby restoring the connection between the wheels B and C until the speed is again increased above the normal.

The operation of opening and closing the brakes takes place in rapid succession, frequently as often as a hundred times a minute. In order to avoid a destructive hard action of the parts, it is essential to make the elastic connection between the free ends of the brakes as efficient and as yielding as possible within the limits presented by the position of the brakes, and this is accomplished by the employment of the two connected springs between the free ends of brakes on opposite sides of the shaft.

By placing the fulcrums of the brakes diametrically opposite each other and arranging the devices whereby the free ends of the brakes are connected in a diametrical line, a perfect symmetry in the construction of the wheels or pulleys is obtained and the transmitting device is perfectly balanced, thereby insuring the quiet steady running of the device, and perfect safety, as well as avoiding excessive and side friction on the bearings in which the rotating parts are journaled.

I represents a spring or flexible bar, which is secured with its outer end to the wheel C and has its inner end arranged at a short distance from the axis of rotation.

$i$ is a ratchet or tooth, which is secured to a bearing, J, or other fixed support near the axis of rotation in such manner that the inner end of the spring will be thrown out far enough by centrifugal force to clear the tooth $i$, as represented in dotted lines in Fig. 4, when the wheel rotates with the normal speed.

When the speed falls below the normal, the centrifugal force is insufficient to overcome the tendency of the spring to swing with its inner end toward the axis of rotation, and the inner end of the spring comes in contact with the tooth $i$, and in sliding over the same during the rapid rotations of the wheel causes a noise, which informs the attendant that the speed is below the normal.

In the modified construction represented in Fig. 5 the brake-blocks are replaced by brake-bands, which are attached to levers K in such manner that the bands are loosened from the wheel B by swinging the levers K outwardly under an excessive speed, and tightened by the springs $f$ when the speed slackens.

In the modified construction represented in Fig. 6 the brakes are replaced by pawls M, which engage with ratchet-teeth on the face of the wheel B, and which are thrown out of engagement by centrifugal force and into engagement by the springs as the speed increases and diminishes.

My improved speed-regulator is especially desirable for use in connection with the centrifugal separators employed for creaming milk and other centrifugal and other machines having a high rotative speed, and in which the quality and quantity of the effect produced is dependent upon maintaining a uniform normal speed of the machine. It may also be employed as a safety-coupling for shafting, whereby the speed of the driven shafting is automatically regulated.

I claim as my invention—

1. In an automatic centrifugal speed-regulator, the combination, with the rotating driving wheel or pulley and the rotating driven wheel or pulley, of coupling devices pivoted to the driven wheel on opposite sides of the driving-wheel, and extending from their pivots in the same direction around the driving-wheel, compared with the direction in which the wheel revolves, substantially as set forth.

2. The combination, with the rotating driving wheel or pulley and the rotating driven wheel or pulley, of coupling devices pivoted to the driven wheel diametrically opposite each other, and a spring-connection arranged diametrically between the free ends of the coupling devices, substantially as set forth.

3. The combination, with the driving wheel or pulley and the driven wheel or pulley, of coupling devices pivoted to the driven wheel diametrically opposite each other, springs attached to the coupling devices and arranged on the inner sides of the same, and a link whereby the springs are connected, substantially as set forth.

4. The combination, with the driving wheel or pulley and the driven wheel or pulley and an automatic coupling device which is thrown out of engagement when the speed is excessive, of an alarm which is rendered audible when the speed falls below the normal, substantially as set forth.

5. The combination, with the wheel or pulley, of a rotating alarm which is thrown out of its operative position by centrifugal force and returned to its operative position when the effect of the centrifugal force is diminished by a reduction of the speed, substantially as set forth.

6. The combination, with a wheel or pulley, of a spring-arm, I, rotating therewith, and a fixed tooth, $i$, which latter is touched by the spring-arm when the speed of the wheel or pulley is abnormal, substantially as set forth.

Witness my hand this 23d day of November, 1885.

CHARLES W. A. KOELKEBECK.

Witnesses:
R. G. KEES,
D. CLEAVER.